United States Patent Office 3,652,674
Patented Mar. 28, 1972

3,652,674
PROCESS FOR THE CATALYTIC DEHYDROGENATION OF CYCLODODECANOL AND CATALYST THEREFOR
Manfred Zur Hausen, Günter Höckele, and Wilhelm Knepper, Marl, Germany, assignors to Chemische Werke Huls Aktiengesellschaft, Marl, Germany
No Drawing. Filed Aug. 10, 1967, Ser. No. 659,602
Claims priority, application Germany, Aug. 12, 1966, C 39,864
The portion of the term of the patent subsequent to June 22, 1988, has been disclaimed
Int. Cl. C07c 35/02
U.S. Cl. 260—586 A                2 Claims

ABSTRACT OF THE DISCLOSURE

Cyclododecanol is dehydrogenated in liquid phase by contacting it, at elevated temperature e.g. from about 180° C. up to the boiling point of the cyclododecanol (271° C.), with a catalyst consisting essentially of a molded and calcined mixture (calcined at 300–700° C.) of a carrier of highly dispersed silicic acid which after drying at 120° C. still has a loss on ignition of 1–10% by weight, 5–20% by weight of copper relative to the loss on ignition, up to 5% by weight of chromium and 0.5 to 15% by weight of barium ions.

---

In our application Ser. No. 608,982 filed Jan. 13, 1967, now U.S. Pat. No. 3,586,720, issued on June 22, 1971, we have disclosed a process for the dehydrogenation of cyclododecanol in the liquid phase at elevated temperature by means of a copper catalyst produced by the addition to a carrier of active aluminum oxide or highly dispersed silicic acid which after drying at 120° C. has a loss on ignition of 1 to 10% by weight of a thermally decomposable copper compound in quantity sufficient to supply 5–20 parts by weight of copper per part by weight of loss on ignition, an amine or copper-amine complex capable of forming with said copper compound a complex salt that will decompose only at temperatures above 150° C. and up to 5% by weight of chromium based on the weight of the catalyst and calcining at 600–1100° C.

The present invention is based upon the discovery that it is advantageous to include from 0.5 to 15%, preferably about 4% by weight of barium ions in the catalyst. This content of barium ions gives the unexpected advantageous result that in the production of the catalyst the high calcining temperature of 600–1100° C. can be lowered to 300–700° C., preferably about 500° C. without reducing the yield of cyclododecanone or increasing the production of by-products.

The influence of the barium in the catalyst upon the formation of cyclic olefines (cyclododecene) is noticeable when a catalyst as disclosed in said application Ser. No. 608,982 but calcined at only 500° C. is compared with a similar catalyst containing about 8% of barium chromate and calcined at the same temperature. At an operating temperature of 240° C. and a charge of 500 ml. of cyclododecanol per 1000 ml. of catalyst the first catalyst gives an olefine formation up to 2.5% with a conversion of 85–90% while under the same conditions with the second catalyst modified with barium chromate the olefine formation is not over 0.5%.

EXAMPLE 2.5 kg. of silicic acid powder having a weight loss on drying of 4.5% and a loss on ignition of 5.8% (ignition temperature of 750° C.) is intimately mixed with 8.4 kg. of basic copper carbonate (55.5% Cu) powder. Then one-after the other 10.55 l. of barium acetate solution which contains 3.03 kg. of barium acetate, 5.6 l. of chromic acid solution having a chromic acid content of 2.03 kg. and 21.5 l. of a solution that contains 3.65 kg. of copper in the form of Cu (NH$_3$)$_4$CO$_3$ and 0.325 kg. of ethylenediamine are sprayed upon the powder while stirring it. The resulting mass is pressed into the form of granules in a granulator which are then dried for 16 hours in a stream of hot air at 100 to 110° C. and then calcined in moving air at 500 to 700° C.

(a) 500 ml. of the catalyst is charged into a reactor operating as a bottoms reactor and 250 ml. or cyclododecanol is introduced hourly. After the reduction at 180–200° C. has ended the temperature is raised to 240° C. The dehydrogenation product contains, besides unreacted cyclododecanol, 88–93% of cyclododecanone and 0.1–0.4% of cyclododecene.

(b) 40 kg. of cyclododecanol per hour is passed continuously over 80 l. of the catalyst in a bottoms reactor at 210–215° C. The resulting dehydrogenation product consists of 82% of cyclododecanone, 17.6% of cyclododecanol and 0.4% of cyclododecene. After 1500 hours of operation there is still no substantial deterioration of the catalyst activity.

We claim:
1. A method of dehydrogenating cyclododecanol which comprises contacting the cyclododecanol in liquid phase at a temperature within the range from about 180° C. to 271° C. with a barium-chromium-copper catalyst calcined at 300–700° C. Consisting essentially of (a) a carrier consisting of highly dispersed silicic acid having a loss on ignition after drying at about 120° C. of from 1 to 10% by weight, (b) from 5 to 20 parts by weight of copper per part by weight of said loss on ignition, (c) from 0.5 to 15% by weight of barium and (d) up to 5% of chromium based on the total weight of the catalyst.

2. Method according to claim 1 in which said catalyst is prepared by mixing said dried carrier in powder form with copper carbonate in powder form; moistening said powder mixture with a barium salt solution in quantity sufficient to supply from 0.5 to 15% by weight of barium based on the weight of the finished catalyst, a solution of copper-ammonia carbonate and of ethylene diamine, the total addition of copper compounds being sufficient to supply from 5 to 20 parts by weight of copper per part by weight of said loss on ignition, and with chromic acid solution in quantity sufficient to supply up to 5% by weight of chromium based on the weight of the finished catalyst; molding the mixture into granular form; drying the granules; and calcining the dried granules at 300–700° C.

References Cited
UNITED STATES PATENTS

| | | | |
|---|---|---|---|
| 3,374,270 | 3/1968 | Zurhausen | 260—586 A |
| 3,366,687 | 1/1968 | Ellis | 260—596 |
| 2,649,420 | 8/1953 | MacLean | 260—596 |
| 2,634,295 | 4/1953 | MacLean | 260—596 |
| 2,634,242 | 4/1953 | MacLean | 260—596 |
| 2,218,457 | 10/1940 | Winans | 260—586 |

LEON ZITVER, Primary Examiner

N. MORGENSTERN, Assistant Examiner

U.S. Cl. X.R.
252—457; 260—666

CERTIFICATE OF CORRECTION

Patent No. 3,652,674  Dated March 28, 1972

Inventor(s) MANFRED ZUR HAUSEN and WILHELM KNEPPER and GÜNTER HÖCKELI

It is certified that error appears in the above-identified patent and that said Letters Patent are hereby corrected as shown below:

In claim 1, 2nd line from bottom, insert --- by weight --- after "5%"

Signed and sealed this 11th day of July 1972.

(SEAL)
Attest:

EDWARD M. FLETCHER, JR.
Attesting Officer

ROBERT GOTTSCHALK
Commissioner of Patents